United States Patent
Uriarte

(10) Patent No.: US 6,181,423 B1
(45) Date of Patent: Jan. 30, 2001

(54) LINEAR ENCODER PROVIDING ENGAGEMENT BY ENGRAVING

(76) Inventor: Jorge Uriarte, 13 Cornwallis, Irvine, CA (US) 92620

(*) Notice: Under 35 U.S.C. 154(b), the term of this patent shall be extended for 0 days.

(21) Appl. No.: 09/291,687

(22) Filed: Apr. 13, 1999

Related U.S. Application Data

(60) Provisional application No. 60/103,200, filed on Oct. 6, 1998.

(51) Int. Cl.⁷ ........................................ G01B 11/14
(52) U.S. Cl. .................. 356/375; 377/24; 250/237 G; 341/13
(58) Field of Search ........................ 356/373, 375, 356/138, 374; 377/3, 24, 17, 53; 250/237 G, 231.13, 231.15, 231.14, 231.18, 559.32, 559.26; 33/706, 707; 341/11, 13, 2; 345/184

(56) References Cited

U.S. PATENT DOCUMENTS

| | | |
|---|---|---|
| 3,886,542 | 5/1975 | Ohtsuka . |
| 3,965,340 | 6/1976 | Renner et al. . |
| 4,101,764 | 7/1978 | Nelle . |
| 4,215,337 | 7/1980 | Blanchard . |
| 4,221,963 * | 9/1980 | Fushimi ........................ 250/237 G |
| 4,229,647 | 10/1980 | Burkhardt . |
| 4,358,753 * | 11/1982 | Cascini ........................ 349/870.29 |
| 4,423,958 * | 1/1984 | Schmitt ........................ 356/375 |
| 4,698,828 | 10/1987 | Hiramoto . |
| 4,788,422 * | 11/1988 | Fujiwara ........................ 250/237 G |
| 5,131,017 | 7/1992 | Huber et al. . |
| 5,734,474 * | 3/1998 | Haecker et al. ................ 356/375 |

* cited by examiner

Primary Examiner—Hoa Q. Pham
(74) Attorney, Agent, or Firm—Gene Scott-Patent Law & Venture Group

(57) ABSTRACT

A linear measurement and control apparatus uses a press roll for directly engraving the surface of a linear control bar and then engaging the control bar which is attached to a machine element, to measure its linear motion and thereby identifying its position. As the machine element moves, the attached control bar transmits its motion to the press roll, inducing rotation. The press roll is attached to a measurement disk having a sensory pickup so that rotation of the press roll is sensed. Light transmission is used for sensing motion of a measurement disk and for counting pulses for determining position.

17 Claims, 1 Drawing Sheet

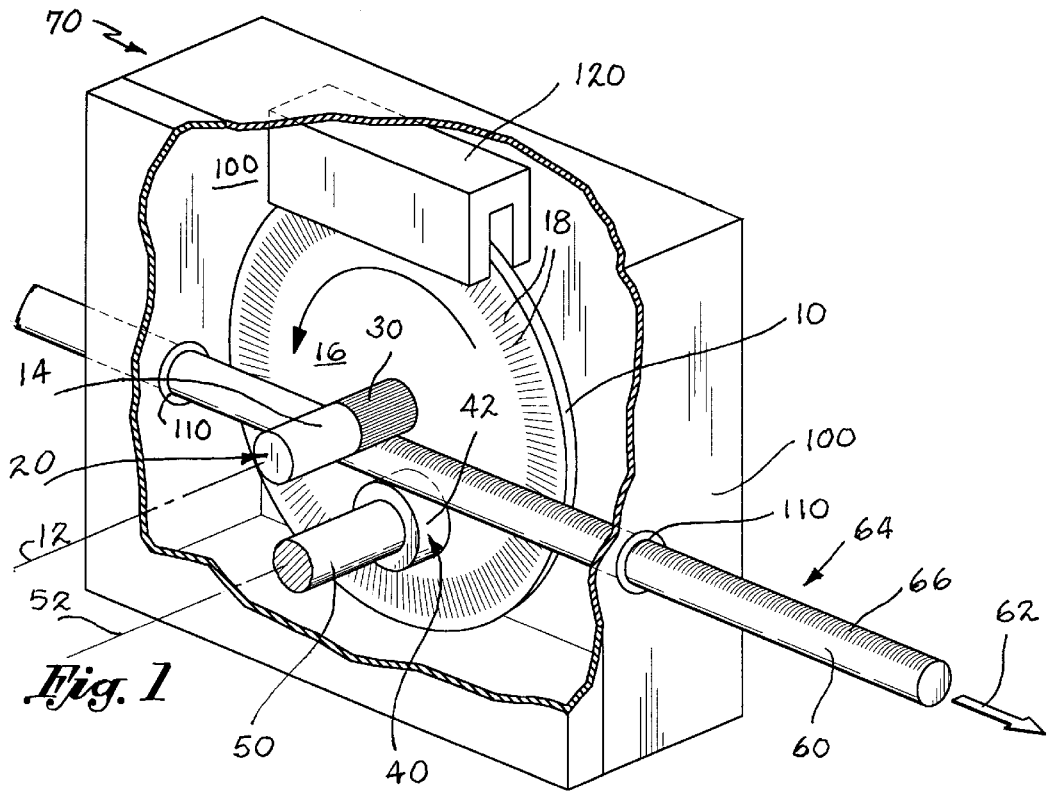
Fig. 1
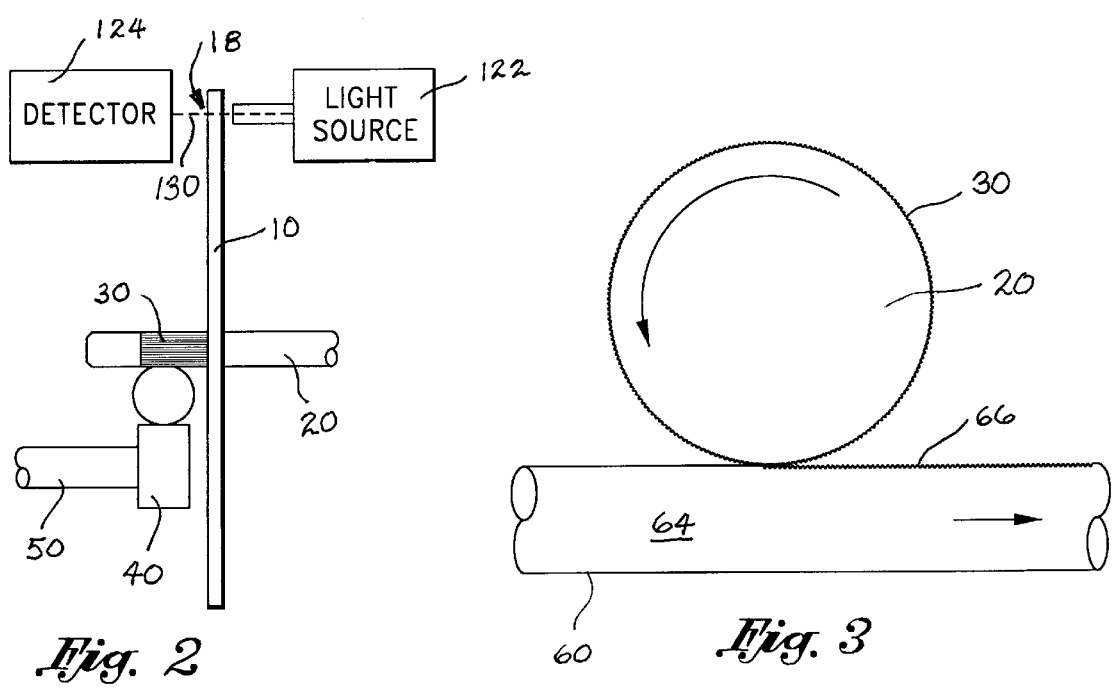
Fig. 2
Fig. 3

LINEAR ENCODER PROVIDING ENGAGEMENT BY ENGRAVING

This application claims the filing date of a previously filed provisional application having serial No. 60/103,200 and an assigned filing date of Oct. 6, 1998 and which contains subject matter substantially the same as presented in the present application.

BACKGROUND OF THE INVENTION

1. Field of the Invention

This invention relates generally to linear measurement tools, and more particularly to a linear measurement system that is inexpensive and highly accurate.

2. Description of Related Art

The following art defines the present state of this field:

Huber et al., U.S. Pat. No. 5,131,017 describes an evaluation device with an absolute value counter providing an incremental position measuring system which determines absolute position even in case of loss of the main power supply. The evaluation device is operated by means of an emergency power supply operated by means of an emergency power supply while the main power supply is out. Following the restoration of the main power supply, counting pulses are supplied to a follow-up counter by a pulse emitter, until the follow-up counter has reached the counter reading of the absolute value counter. Two rectangular signals, which are phase-shifted by 90 degrees in relation to each other, are formed as a function of the counting signals, which are present at the evaluation device in the form of output signals.

Hiramoto, U.S. Pat. No. 4,698,828 describes a system for sensing the position of an object such as a rotating member. The system provides a plurality of photo-couplers coupled with the interposition of a rotary disc having slits and rotating with the object. The system further has a position signal generating circuit for receiving signals produced by the photo-couplers and producing a series of component position signals differing in phase successively by a predetermined phase difference, a counting circuit having an up/down count for determining the position of the object by counting occurrences of a predetermined change recurring periodically in the component position signals, and a direction determining circuit for producing an up/down counter. Each time the predetermined change occurs in any one of he component position signal, the direction determining circuit determines the order in which the change occurs in two successive component position signals.

Burkhardt, U.S. Pat. No. 4,229,647 describes an improved electronic counter for use with an incremental measuring device. The counter includes two or more individual counters, a display unit, and a switch for selectively connecting any one of the individual counters with the display unit. Each of the individual counters may be individually set to a separate zero point so that each counter may be used to store a position value in a separate frame of reference. The position value stored in any one of the individual counters may be switched to the display unit without disturbing the contents of the other individual counters. In the preferred embodiment, the counter includes a circuit for automatically resetting a first individual counter to zero whenever the measuring device senses a predetermined reference mark, thereby automatically maintaining a calibrated zero point in that counter. The preferred embodiment also included a power fail circuit which generates a warning signal when the measuring device is operated following an interruption in the line voltage used to power the device. This warning signal is maintained until the first individual counter is automatically reset, and the device is again calibrated for use.

Renner et al. U.S. Pat. No. 3,965,340 describes an apparatus relating to an optical counting apparatus, which is employed in combination with an electronic hand-held calculator. The structure of this invention greatly expands the use of the hand-held calculator by permitting such to be employed as a measuring device and a unit counter. An optical device is activated by the difference between transmission of light and darkness. This activation is used as a counting apparatus or a measurer of distances with the accumulated count or the distance measure to be read on the display unit of the calculator Ohtsuka, U.S. Pat. No. 3,886,542 describes a member, on which are marked scales having respective different pitches between their graduations, and is movable past a graduation detecting position at which there are plural graduation detectors each operatively associated with a different respective scale. One scale has fine or "unit" graduations arranged successively in groups of ten, and another scale extending parallel to the first scale has coarse of "tens" graduations each corresponding to a respective group of fine graduations. Each tenth fine graduation is relatively elongated. The detectors cooperate, respectively, with the fine graduations, with the elongated fine graduations and the coarse graduations. A counter has plural digit positions, with one digit position being a "units" position and a next higher digit position being a "tens" digit position. An electronic switching circuit connects the detectors to the counter and is operable, responsive to movement of the scale bearing member past the detecting position at a relatively low speed, to supply, to the low digit position of the counter, input signals from the detector operatively associated with the scale having the fine graduations. The electronic switching circuit is operable, responsive to movement of the scale bearing member past the detecting position at a relatively higher speed, to supply, to the next higher digit position of the counter, input signals from the detector operatively associated with the coarse graduation scale. Switching between the two digit positions of the counter, responsive to a change in the speed of movement of the scale bearing member past the graduation detecting position, is effected only responsive to simultaneous detection of a relatively elongated fine graduation and the corresponding coarse graduation.

Nelle, U.S. Pat. No. 4,101,764 describes an incremental measuring instrument having a series of fixed reference marks along one edge of a grid scale in which a series of movable magnets are located along the opposite edge of the grid scale so that a magnet may be associated with each reference mark which is needed for control purposes in the particular application in which the system is being used. The magnets are movable mounted so that reference marks not needed for control purposes in any specific application do not have magnets associated with them. An electric switch, preferably a magnetically actuated Reed switch, is also provided in the system's sensor head. Electrical impulses generated by the magnets and the switch are transmitted to an electronic comparator along with electric impulses generated when the sensor head passes over the reference marks. This electronic comparator is connected to the system's electronic control counter when and impulse is simultaneously fed to the comparator by the switch associated with the magnets.

Blanchard, U.S. Pat. No. 4,215,337 describes a form of shaft-position encoder employing "fast" and "slow" rotary selectors coupled by gearing to each other and to a shaft whose position is to be encoded. The selectors cooperate selectively with elements in respective "fast" and the "slow" circular series of elements. Two counters register the number of pulses in a train varying in accordance with the number of elements in each of the "fast" and the "slow" series between one end of the series and an element in cooperation with a related selector. The combined values registered in the counters represent the shaft position code. The inherent uncertainty in recognizing when the "slow" counter should register any particular value represented by the position of its selector along its series of elements could create significant ambiguity, which is here resolved through use of the value registered in the counter of the "fast" series of elements.

The prior art teaches a variety of encoders and measurement systems. However, the prior art does not teach that such a system may provide a press roll in compressive contact with a linear moving control bar wherein the control bar is engraved by the press roll during an initial linear pass and thereafter remains in sync therewith due to continued engagement of the engraving. The present invention fulfills these needs and provides further related advantages as described in the following summary.

SUMMARY OF THE INVENTION

The present invention teaches certain benefits in construction and use which give rise to the objectives described below.

The present invention provides a linear measurement and control apparatus using one or a pair of opposing press rolls for engraving and thereby meshing a linear control bar attached to a machine element for measuring its linear motion and thereby identifying its position. As the machine element moves, the attached control bar transmits its motion to the axle of a measurement disk having a sensory pickup feature so that rotation of the disk may be sensed. The axle presents an embossed surface to the surface of the control bar so that after an initial pass, the control bar is engraved by the axle and thereafter the axle and the bar are maintained in synchronization by the engravement.

A primary objective of the present invention is to provide a linear measurement apparatus having advantages not taught by the prior art.

Another objective is to provide such an apparatus having low manufacturing cost.

A further objective is to provide such an apparatus capable of measuring repetitive linear motion in two opposing directions.

A still further objective is to provide such an apparatus capable of measuring reversible linear motion without backlash through the use of an engraved pattern.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a perspective view of the preferred embodiment of the present invention;

FIG. 2 is a side elevational view thereof without an enclosure shown in FIG. 1; and FIG. 3 is an enlarged front elevational view thereof showing the manner in which a control rod of the invention is embossed.

Other features and advantages of the present invention will become apparent from the following more detailed description, taken in conjunction with the accompanying drawings, which illustrate, by way of example, the principles of the invention.

DETAILED DESCRIPTION OF THE INVENTION

The above described drawing figures illustrate the invention, a linear measurement apparatus functionally comprised of a measurement wheel 10, press roll assembly 20, 40 and linear motion control bar 60. The disk shaped measurement wheel 10 is mounted for rotation about a first rotational axis 12 on an integral, first shaft 20 as shown in FIG. 1. A peripheral surface 14 of this first shaft 20 forms a first press roll and has a hardened, preferably very slightly concave, surface with texture embossment 30 as illustrated in FIGS. 1 and 2. A second press roll 40, also has a hardened peripheral surface 42 and may be advantageously concave as well, and is mounted for rotation on second shaft 50 about a second rotational axis 52 that is parallel to the axis of rotation 12 of the first shaft 20 as shown in FIG. 1. The hardened peripheral surfaces 14, 42 of the two press rolls 20, 40 respectively, are positioned in a spaced apart relationship. The measurement apparatus also includes a linear, elongated control bar 60 engaged in compressive contact between the peripheral surfaces of the first 20 and the second 40 press rolls, as illustrated in both FIGS. 1 and 2, such that linear axial motion, as defined by arrow 62 in FIG. 1, of the control bar 60 causes rotation of the press rolls 20, 40. The external surface 64 of the control bar 60 is prepared for and capable of receiving an engraved impression 66 from the peripheral surface embossment 30 of the first press roll 20. Thus, the control bar 60 must have a surface soft enough to receive the engraving, i.e., it must be softer than the surface 64. This impression 66, depicted from the side in FIG. 3, is accomplished during an initial linear axial motion of the control bar 20 as it is laterally pressed against first press roll 20 by second press roll 40. After the initial engraving of the control bar 60 is complete, the engraved impression 66 on the control bar 60, and the corresponding texture embossment 30 of the first press roll 20, remain mutually engaged and thereafter provide for coordinated mutual synchronous movement with repeated control bar 60 linear motion. This control bar linear movement also causes the disk shaped measurement wheel 10 to rotate about the first axis 12. As this wheel rotation occurs, the change in position is detected and measured by sensor devices designed and positioned for this purpose.

The present invention further provides for fully enclosing the measurement wheel 10 and press rolls 20 and 40. This enclosure 70 may take the form as shown in FIG. 1, or any other enclosure shape as is well known in the art. The enclosure 70 provides two opposing walls 100 that comprise a pair of opposing coaxial apertures 110, for frictionally engaging and positionally guiding the control bar 60. These apertures 110, preferably made of a soft teflon® or other compatible material, enable linear sliding motion of the control bar 60 through them but are in contact with the outer surface 64 of the control bar 60 so as to exclude dust and dirt from the interior of the enclosure 100.

To accomplish the objective of accurately measuring the linear movement of the control bar 60, the precise detection of changes in position of the measurement wheel 10 is required. The present invention teaches several alternative methods which are well known in the art and so will be described only briefly. The illustration of FIG. 1 provides an understanding of any one of the following methods. One method of measurement wheel 10 position sensing includes the use of a radially oriented initia pattern 18 on an exterior surface 16 of the measurement wheel 10 in combination with a sensory means 120. The inditia pattern 18 may use, for example, method (A) opaque lines, method (B) transparent lines or method (C) magnetic stripes used in conjunction with a light source 122 and receiver 124 for the former two approaches and a magnetic sensor for the later approach. Both the light sensor and magnetic sensor are fully represented by detector 124 in FIG. 2.

FIG. 2 shows the method used with light beam source 122, positioned on a first side of the measurement wheel 10. This light beam source 122 directs a light beam, represented by the dashed line, through the measurement wheel 10, assuming it to be transparent, and the beam is then received by detector 124 which is positioned in opposition to the light beam source 122. Upon wheel rotation, the light beam is sequentially interrupted by the opaque inditia as it passes through the beam 130.

Another method of measurement wheel position sensing includes the application of a radially oriented transparent inditia pattern on an opaque surface of the measurement wheel 10. Illumination and detection is accomplished in the same manner as previously described. A further means of measurement wheel position sensing comprises the use of a radially oriented inditia that is composed of materials having magnetic characteristics. The movement of these magnetic inditia elements is detected by a magnetic sensor, also represented by the detector 124, positioned on a first side of the measurement wheel 10, and measures the moving magnetic field as the magnetic inditia elements pass by in close proximity during rotation of the measurement wheel 10.

An additional means for measurement wheel position sensing is provided by a radially oriented reflective inditia that is fixed to a non-reflective surface of the measurement wheel 10 and the light beam source positioned on a first side of the measurement wheel 10 that directs the light scattered from the inditia's reflective surface. Then as the measurement wheel 10 rotates, the reflected light is sensed by detector 124 positioned for receiving reflected light from the reflective inditia surface.

One or more of he above described measurement wheel position sensing techniques may be combined to accomplish the desired measurement objectives depending upon the specific application. Detected light or magnetic pulses produced by at the detector 124 are electronically counted, as is well known in the art, with each count indicating one increment of rotation of the measurement wheel 10. The incremental counts are typically counted by an electronic circuit of well known type for accurately representing the linear change in the position of the control bar. The precise and repeatable relationship that exists between the linear control bar 60 movement and radial movement of the measurement wheel 10 is insured by the continuous engagement of the engraving on the control bar surface and the press roll embossment 66. Economically providing this capability is the objective of this invention.

Clearly, the present invention may use the well known technique of dual position sensing at the measurement wheel 10 in order to determine rotational direction. In this approach two or more sensors within sensory means 120. Logic circuits for such use are well known.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A linear measurement apparatus comprising:
    a disk shaped measurement wheel adapted for rotation about a first rotational axis, the measurement wheel providing, an integral concentrically mounted, laterally positioned, first press roll having a hardened, concave, peripheral surface presenting a texture embossment thereon;
    a second press roll having a hardened peripheral surface and adapted for rotation about a second rotational axis parallel to the first rotational axis, the hardened peripheral surfaces of the two press rolls positioned in a spaced apart relationship;
    a linear, elongate control bar having an external bar surface, the control bar engaged between the peripheral surfaces of the first and the second press rolls such that linear axial motion of the control bar causes rotation of the press rolls;
    the external bar surface of the control bar being functionally enabled for receiving an engraved impression of the surface texture embossment of the first press roll peripheral surface during an initial said linear axial motion of the control bar against the first press roll;
    the engraved impression of the control bar and the corresponding texture embossment of the first press roll being functionally enabled thereafter for coordinated mutual engagement with linear motion of the control bar;
    the disk shaped measurement wheel providing a means for rotational position sensing.

2. The apparatus of claim 1 further providing an enclosure comprising a wall means for fully enclosing the measurement wheel and press rolls and further comprising a pair of opposing apertures, the apertures frictionally engaging the control bar for enabling sliding motion thereof therethrough.

3. The apparatus of claim 1 wherein the position sensing means comprises a radially oriented opaque indicia means fixed to a transparent surface of the measurement wheel.

4. The apparatus of claim 3 further comprising a light beam source fixedly positioned on a first side of the measurement wheel for directing a light beam therethrough, and a light beam detector position in opposition to the light beam source, such that the light beam is interrupted by the opaque indicia with rotation of the measurement wheel.

5. The apparatus of claim 1 wherein the position sensing means comprises a radially oriented transparent indicia means fixed to an opaque surface of the measurement wheel.

6. The apparatus of claim 5 further comprising a light beam source fixedly positioned on a first side of the measurement wheel for directing a light beam therethrough, and a light beam detector positioned in opposition to the light beam source, such that the light beam is transmitted by the transparent indicia with rotation of the measurement wheel.

7. The apparatus of claim 1 wherein the position sensing means comprises a radially oriented magnetic indicia means fixed to a surface of the measurement wheel.

8. The apparatus of claim 7 further comprising a magnetic sensor fixedly positioned on a first side of the measurement wheel for sensing the magnetic indicia means with rotation of the measurement wheel.

9. The apparatus of claim 1 wherein the position sensing means comprises a radially oriented reflective indicia means fixed to a non-reflective surface of the measurement wheel.

10. The apparatus of claim 9 further comprising a light beam source fixedly positioned on a first side of the measurement wheel for directing a light beam theretoward, and a reflected light detector positioned for receiving reflected light from the reflective indicia with rotation of the measurement wheel.

11. The apparatus of claim 1 wherein the peripheral surface of the second press roll is concave so as to bias the control bar centrally thereon.

12. The apparatus of claim 1 wherein the position sensing means comprises a radially oriented reflective indicia means fixed to a non-reflective surface of the measurement wheel and further comprising a light beam source fixedly positioned on a first side of the measurement wheel for directing a light beam theretoward, and a reflected light detector positioned for receiving reflected light from the reflective indicia with rotation of the measurement wheel.

13. A linear measurement apparatus comprising:

a disk shaped measurement wheel adapted for rotation about a first rotational axis, the measurement wheel providing, an integral concentrically mounted, laterally positioned, press roll having a hardened, peripheral surface presenting a texture embossment thereon;

a linear, elongate control bar having an external bar surface, the control bar positioned for abutting the press roll such that linear axial motion of the control bar causes rotation of the press roll;

the external bar surface of the control bar being functionally enabled for receiving an engraved impression of the surface texture embossment of the press roll peripheral surface during an initial said linear axial motion of the control bar against the press roll;

the engraved impression of the control bar and the corresponding texture embossment of the press roll being functionally enabled thereafter for coordinated mutual engagement with linear motion of the control bar;

the disk shaped measurement wheel providing a means for rotational position sensing.

14. The apparatus of claim 13 further providing an enclosure comprising a wall means for fully enclosing the measurement wheel and press roll and further comprising a pair of opposing apertures, the apertures frictionally engaging the control bar for enabling sliding motion thereof therethrough.

15. The apparatus of claim 13 wherein the position sensing means comprises a radially oriented opaque indicia means fixed to a transparent surface of the measurement wheel and further comprising a light beam source fixedly positioned on a first side of the measurement wheel for directing a light beam therethrough, and a light beam detector positioned in opposition to the light beam source, such that the light beam is interrupted by the opaque indicia with rotation of the measurement wheel.

16. The apparatus of claim 13 wherein the position sensing means comprises a radially oriented transparent indicia means fixed to an opaque surface of the measurement wheel and further comprising a light beam source fixedly positioned on a first side of the measurement wheel for directing a light beam therethrough, and a light beam detector positioned in opposition to the light beam source, such that the light beam is transmitted by the transparent indicia with rotation of the measurement wheel.

17. The apparatus of claim 13 wherein the position sensing means comprises a radially oriented magnetic indicia means fixed to a surface of the measurement wheel and further comprising a magnetic sensor fixedly positioned on a first side of the measurement wheel for sensing the magnetic indicia means with rotation of the measurement wheel.

* * * * *